(12) United States Patent
Tsai et al.

(10) Patent No.: US 10,976,779 B1
(45) Date of Patent: Apr. 13, 2021

(54) COMPUTER

(71) Applicant: Quanta Computer Inc., Taoyuan (TW)

(72) Inventors: Wen-Hung Tsai, Taoyuan (TW);
Gwo-Chyuan Chen, Taoyuan (TW);
Chi-Jen Yu, Taoyuan (TW); I-Chi Chen, Taoyuan (TW); Po-Sheng Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/822,323

(22) Filed: Mar. 18, 2020

(30) Foreign Application Priority Data

Dec. 26, 2019 (TW) .................................. 108217240

(51) Int. Cl.
*G06F 1/16* (2006.01)
(52) U.S. Cl.
CPC .......... *G06F 1/1652* (2013.01); *G06F 1/1615* (2013.01); *G06F 1/1656* (2013.01); *G06F 1/1662* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,739,810 A * | 4/1998 | Merkel | .................. | G06F 1/1616 345/156 |
| 7,446,757 B2 * | 11/2008 | Mochizuki | ............ | G06F 1/1616 345/168 |
| 7,539,526 B2 * | 5/2009 | Pirila | .................... | G06F 1/1616 455/575.1 |
| 8,082,631 B2 * | 12/2011 | Eromaki | ............... | G06F 1/1681 16/370 |
| 8,208,249 B2 * | 6/2012 | Chin | ..................... | G06F 1/1677 361/679.27 |
| 8,432,331 B2 * | 4/2013 | Schilling | ............. | H04M 1/0247 345/1.3 |
| 8,482,540 B1 * | 7/2013 | Reeves | ............... | G06F 3/04886 345/173 |
| 8,539,705 B2 * | 9/2013 | Bullister | ............... | G06F 1/1615 40/733 |
| 9,651,987 B2 * | 5/2017 | Yeo | ........................ | G06F 1/1669 |
| 10,168,739 B1 * | 1/2019 | Chen | ..................... | G06F 1/1616 |
| 10,254,803 B1 * | 4/2019 | Quinn | ................... | G06F 1/1643 |
| 10,296,052 B1 * | 5/2019 | Quinn | ................... | G06F 3/1423 |
| 10,296,053 B1 * | 5/2019 | Quinn | ................. | G06F 3/03547 |
| 10,429,901 B2 * | 10/2019 | Aurongzeb | .......... | G06F 1/1681 |
| 10,503,215 B1 * | 12/2019 | Quinn | ................... | G06F 3/1423 |
| 10,564,674 B2 * | 2/2020 | Fujimoto | ............. | G06F 1/1652 |
| 10,627,868 B2 * | 4/2020 | Fujimoto | ................. | G09F 9/30 |
| 10,691,177 B2 * | 6/2020 | Quinn | ................. | G06F 3/03547 |
| 10,754,390 B2 * | 8/2020 | Quinn | ................... | G06F 1/1656 |
| 10,775,849 B2 * | 9/2020 | Fujimoto | ............. | G06F 1/1641 |
| 10,802,549 B2 * | 10/2020 | Quinn | ................. | H05K 7/1401 |

(Continued)

*Primary Examiner* — Lisa Lea-Edmonds
(74) *Attorney, Agent, or Firm* — McClure, Qualey & Rodack, LLP

(57) ABSTRACT

A computer is provided, including a keyboard, a pivot shaft, a supporting plate and a screen. The pivot shaft is movably disposed on the keyboard. The supporting plate is connected to the pivot shaft, and is rotatable relative to the keyboard, and includes a supporting plate pivot. The screen is connected to the supporting plate pivot to rotate relative to the supporting plate.

17 Claims, 15 Drawing Sheets

(56) References Cited

U.S. PATENT DOCUMENTS

| | | | |
|---|---|---|---|
| 2008/0273012 A1* | 11/2008 | Bullister | G06F 3/0213 |
| | | | 345/169 |
| 2009/0275366 A1* | 11/2009 | Schilling | G06F 1/1654 |
| | | | 455/566 |
| 2010/0289748 A1* | 11/2010 | Ryu | G06F 1/1624 |
| | | | 345/169 |
| 2018/0108330 A1* | 4/2018 | Wallace | G09G 3/20 |
| 2018/0210515 A1* | 7/2018 | Lyles | G06F 1/1618 |
| 2019/0121399 A1* | 4/2019 | Ku | G06F 1/169 |
| 2020/0042047 A1* | 2/2020 | Quinn | G06F 1/1681 |
| 2020/0050243 A1* | 2/2020 | Kim | G06F 3/0221 |
| 2020/0064889 A1* | 2/2020 | Liang | G06F 3/0416 |
| 2020/0081584 A1* | 3/2020 | Schenone | G06F 1/1616 |
| 2020/0310496 A1* | 10/2020 | Quinn | G06F 1/1624 |

* cited by examiner

COMPUTER

CROSS REFERENCE TO RELATED APPLICATIONS

This application claims priority of Taiwan Patent Application No. 108217240 filed on Dec. 26, 2019, the entirety of which is incorporated by reference herein.

BACKGROUND OF THE DISCLOSURE

Field of the Disclosure

The present disclosure relates to a computer, and more particularly, the present disclosure relates to a computer with a folding-screen.

Description of the Related Art

With the development of different markets, computers are gradually becoming thinner and lighter for ease of carrying and moving. However, market demand is rising for larger computer screens. However, a large screen reduces the convenience of carrying and moving the computer. Today's computers must make a trade-off between being thin and light, and having large screens. They cannot have both. Therefore, there is a need for a folding-screen computer with a large screen and that is, at the same time, easy to carry and move to solve the existing problems.

BRIEF SUMMARY OF THE DISCLOSURE

The present disclosure provides a computer, including a keyboard, a pivot shaft, a supporting plate and a screen. The pivot shaft is movably disposed on the keyboard. The supporting plate is connected to the pivot shaft, and is rotatable relative to the keyboard, and includes a supporting plate pivot. The screen is connected to the supporting plate pivot to rotate relative to the supporting plate.

The present disclosure also provides a computer, wherein the area of the screen is more than twice the area of the keyboard. The keyboard has a pivot groove, the pivot shaft moves in the pivot groove, and the pivot groove has a first pivot groove wall and a second pivot groove wall to limit the movement of the pivot shaft. The screen includes a first screen portion, a second screen portion, and a screen pivot shaft. The second screen portion is connected to the pivot shaft. The screen pivot shaft is connect to the first screen portion and the second screen portion. The first screen portion rotates relative to the second screen portion by the screen pivot shaft. The area of the first screen portion is substantially the same as the area of the keyboard, and the area of the second screen portion is substantially the same as the area of the keyboard.

The present disclosure also provides a computer, wherein the supporting plate further includes a supporting plate body, the supporting plate body is connected to the second screen portion, and the supporting plate body has a supporting plate body side contacting the screen pivot shaft. The screen pivot shaft has a groove, and when the groove accommodates a portion of the keyboard, the supporting plate, the second screen portion, the keyboard and the first screen portion are sequentially arranged and overlap each other. The screen further includes a third screen portion connected to the first screen portion, the second screen portion, and the screen pivot shaft, and the first screen portion rotates relative to the third screen portion by the screen pivot shaft. The first screen portion, the second portion and the third screen portion are located on a plane. The screen pivot shaft has a groove, and when the groove accommodates a portion of the keyboard and a portion of the third screen portion, the screen pivot shaft, the third screen portion and the keyboard are sequentially arranged and overlap each other.

BRIEF DESCRIPTION OF THE DRAWINGS

In order to describe the manner in which the above disclosure and its advantages and features may be obtained, a more detailed description of the above principles will be presented by referring to specific examples illustrated in the accompanying drawings. These drawings only illustrate the exemplary aspects of the present disclosure and should therefore not be considered as limiting the scope of this disclosure. These principles are described and explained with additional features and details by using the following drawings.

DETAILED DESCRIPTION OF THE DISCLOSURE

Figure 1:
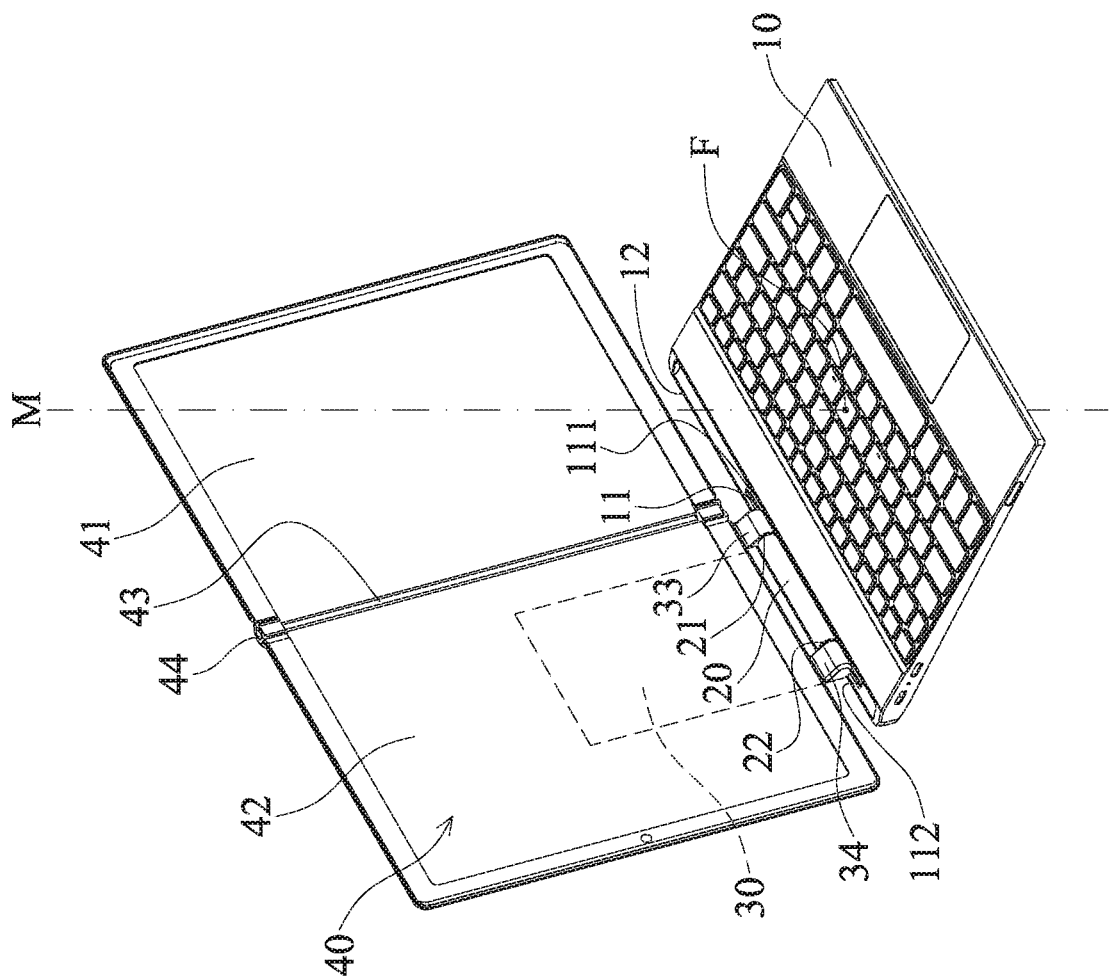
FIG. 1 illustrates a perspective view of a computer according to some embodiment of the present disclosure.

The present disclosure is described with reference to the drawings, in which the same reference numerals are used throughout the drawings to indicate the similar or identical elements. The drawings are not drawn to scale, and the drawings are provided for illustration present disclosure only. The followings describe several aspects of the present disclosure with reference to illustrative exemplary applications. It should be noted that many specific details, relationships, and methods are elaborated to provide a complete understanding of the present disclosure. However, a person ordinary skilled in the art to which the present disclosure belongs will easily understand that the present disclosure may be practiced without one or more specific details or in other ways. In other cases, well-known structures or operations are not shown in detail to avoid obscuring the present disclosure. The present disclosure is not limited to the orders illustrated by the shown actions or events, as some actions may occur in different orders and/or occur with other actions or events. In addition, not all the shown actions or events are required to apply the method according to the present disclosure.

Unless otherwise defined, all terms (including technical terms and scientific terms) used herein have the same meanings as commonly understood by a person ordinary skilled in the art to which the present disclosure belongs. In addition, the terms (for example, the terms defined in commonly used dictionaries) should be interpreted to have a consistent meaning in the context of the relevant field, and unless explicitly defined as such, they are not intended to be idealized or too formal understanding.

Please refer to FIG. 1, a computer 100 of an embodiment of the present disclosure includes a keyboard 10, a pivot shaft 20, a supporting plate 30 and a screen 40.

As shown in FIG. 1, the keyboard 10 has a pivot groove 11, a side 12 and a central axis M, the central axis M penetrates a center F of the keyboard 10. The pivot groove 11 is located on the side 12 of the keyboard 10, and the pivot groove 11 has a first pivot groove wall 111 and a second pivot groove wall 112.

As shown in FIG. 1, the pivot shaft 20 is movably disposed on the keyboard 10. The pivot shaft 20 has a first end 21 and a second end 22. The pivot shaft 20 is movable in the pivot groove 11, and the first end 21 of the pivot shaft 20 may abut the first pivot groove wall 111 or the second end 22 of the pivot shaft 20 may abut the second pivot groove wall 112 to restrict the movement of the pivot shaft 20 in the pivot groove 11.

Figure 2:
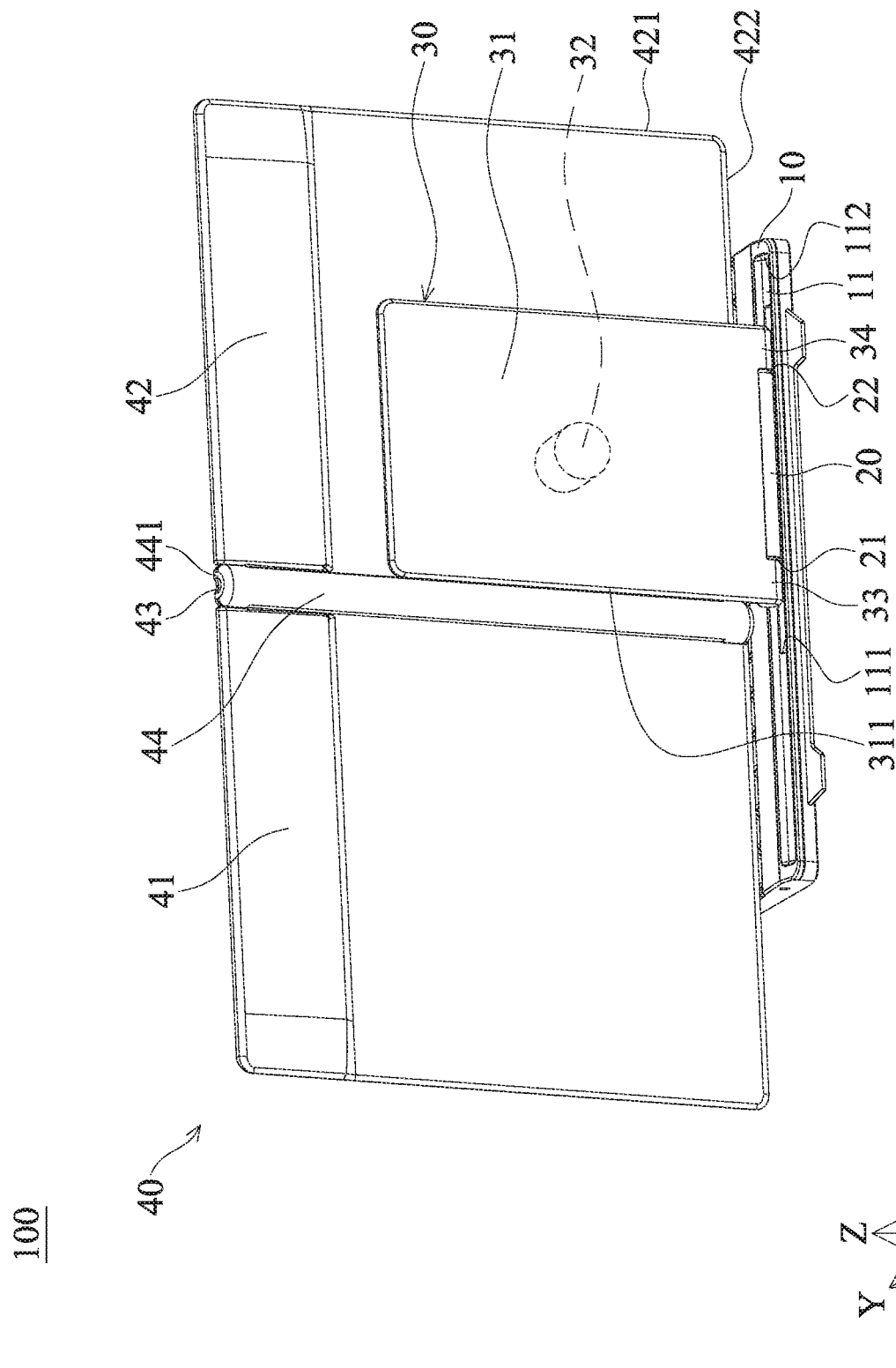
FIG. 2 illustrates a perspective view of the computer from another angle according to some embodiment of the present disclosure.
Figure 3:
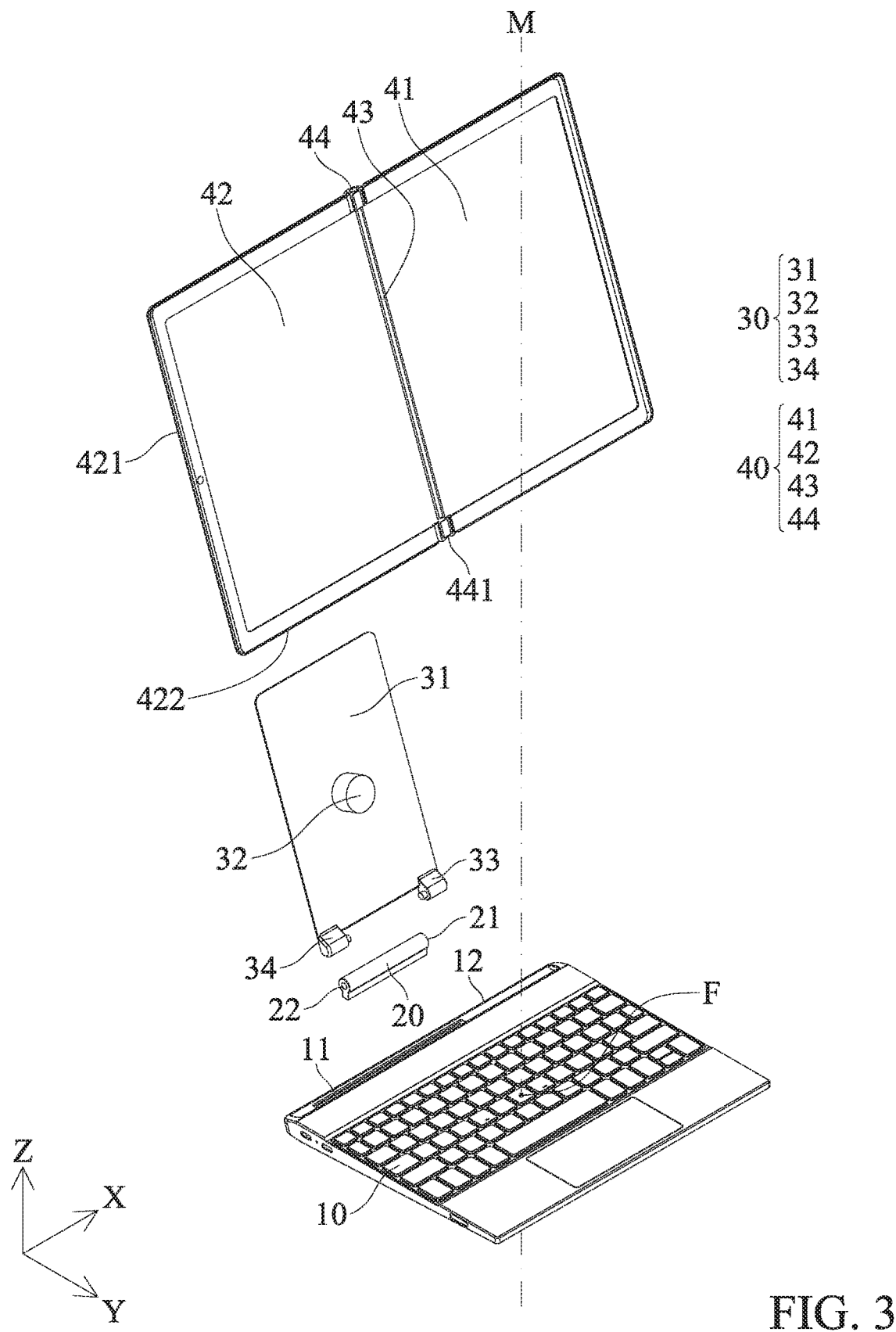
FIG. 3 illustrates an exploded view of the computer according to some embodiment of the present disclosure.

As shown FIG. 2 and FIG. 3, the supporting plate 30 is connected to the pivot shaft 20 and the screen 40, and the supporting plate 30 may rotate relative to the keyboard 10 by the pivot shaft 20. The supporting plate 30 includes a supporting plate body 31, a supporting plate pivot 32, a first protruding portion 33, and a second protruding portion 34. The supporting plate pivot 32 is connected to the screen 40 to rotate the screen 40 relative to the supporting plate body 31. It should be noted that the supporting plate pivot 32 is disposed on the supporting plate body 31, and the supporting plate pivot 32 is shielded by the supporting plate body 31, so that the supporting plate pivot 32 in FIG. 2 is shown as a dashed line. The supporting plate pivot 32 shown in the drawings is only an example, the supporting plate pivot 32 of the computer 100 is not limited to the shape shown in the drawings. The first protruding portion 33 of the supporting plate 30 is connected to the first end 21 of the pivot shaft 20, and the second protruding portion 34 of the supporting plate 30 is connected to the second end 22 of the pivot shaft 20. As a result, the supporting plate 30 may rotate relative to the pivot shaft 20, thereby rotating relative to the keyboard 10. The supporting plate body 31 has a supporting plate body side 311, when the screen 40 is in some states, the supporting plate body side 311 may abut against a screen pivot shaft 44.

As shown in FIG. 2 and FIG. 3, the screen 40 is disposed on the supporting plate 30. The screen 40 includes a first screen portion 41, a second screen portion 42, a third screen portion 43, and a screen pivot shaft 44. The second screen portion 42 has a first side 421 and a second side 422. The screen pivot shaft 44 has a groove 441. The first screen portion 41 is connected to the third screen portion 43, and the second screen portion 42 is connected to the third screen portion 43, but the first screen portion 41 is not directly connected to the second screen portion 42. The second screen portion 42 is also connected to supporting plate 30 by the supporting plate pivot 32. The screen pivot shaft 44 is connected to the first screen portion 41, the second screen portion 42 and the third screen portion 43. The first screen portion 41 may rotate relative to the second screen portion 42 and the third screen portion 43 by the screen pivot shaft 44, and the third screen portion 43 may rotate relative to the second screen portion 42 by the screen pivot shaft 44. It should be noted that the area of the first screen portion 41 is substantially the same as the area of the keyboard 10, and the area of the second screen portion 42 is substantially the same as the area of the keyboard 10. That is, the area of the first screen portion 41 is substantially the same as the area of the second screen portion 42, and the area of the screen 40 is more than twice the area of the keyboard 10.

Figure 4A:
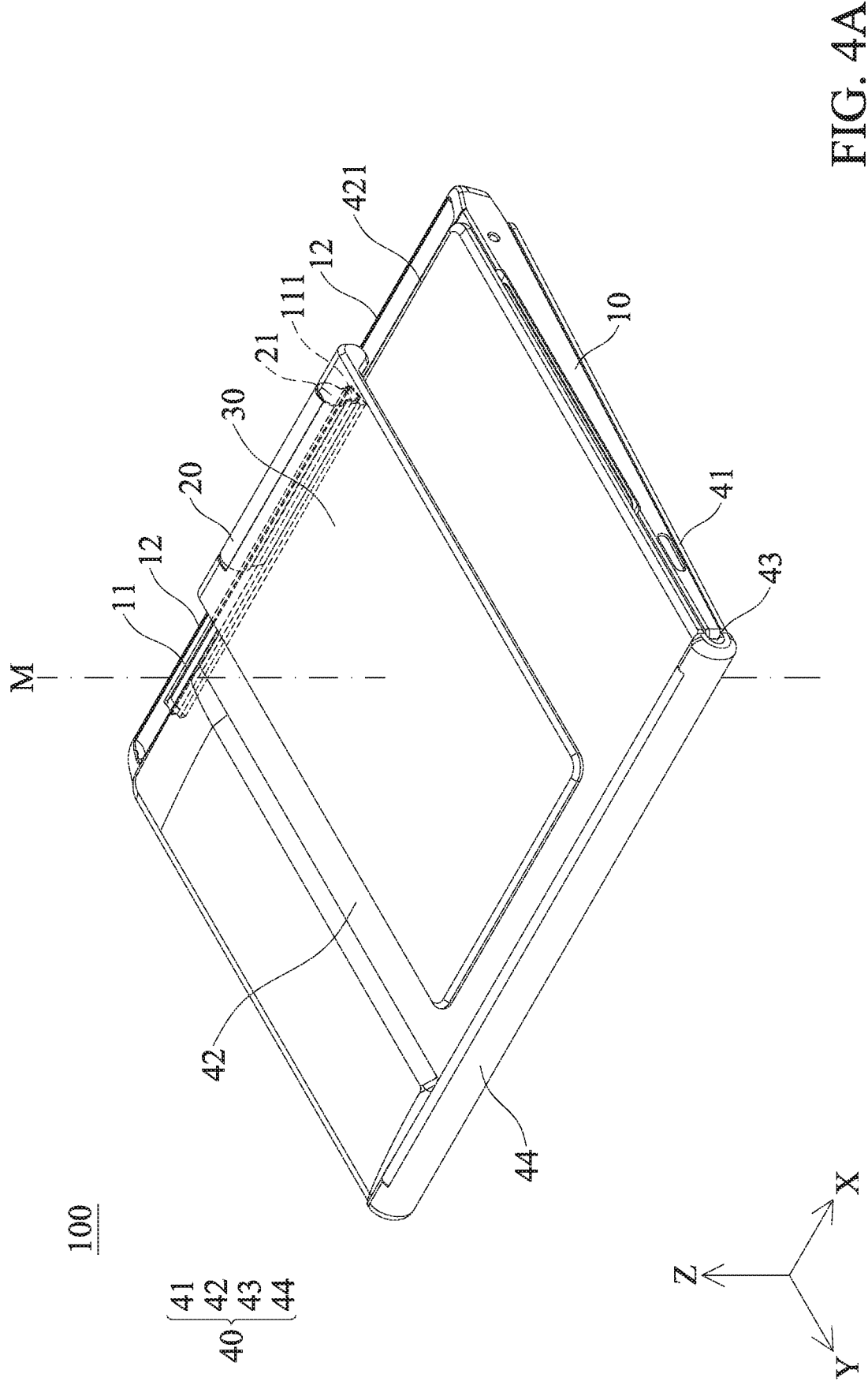
FIG. 4A illustrates a perspective view of the computer in a completely closed state according to some embodiment of the present disclosure.

Please refer to FIG. 4A, FIG. 4A is a schematic view of the computer 100 in a completely closed state. In the completely closed state, the supporting plate 30, the second screen portion 42, the keyboard 10 and the first screen portion 41 are sequentially arranged and overlap each other and are penetrated by the central axis M. Furthermore, in the completely closed state, the first end 21 of the pivot shaft 20 abuts the first pivot groove wall 111 of the pivot groove 11. Please refer to FIG. 4B, when the computer 100 is in the completely closed state, the groove 441 of the screen pivot shaft 44 accommodates a portion of the keyboard 10 and a portion of the third screen portion 43. It should be noted that the portion indicated by the dashed line in FIG. 4A represents the portion that is actually shielded by other element of the computer 100 (not able to be directly observed by the naked eye).

Figure 4B:
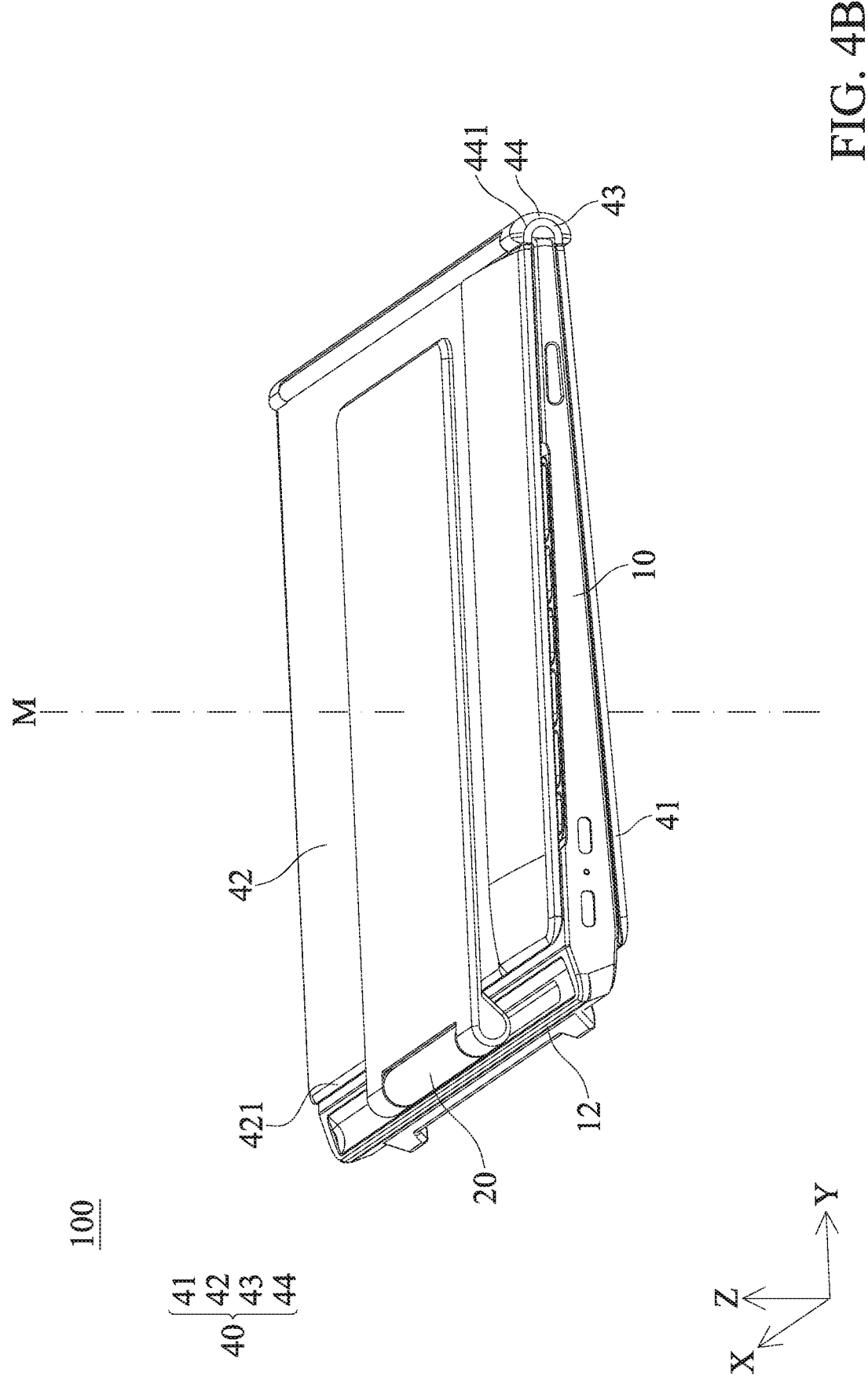
FIG. 4B illustrates a perspective view of the computer in a completely closed state from another angle according to some embodiment of the present disclosure.

Please continue to refer to FIG. 4A and FIG. 4B, the screen pivot shaft 44, the third screen portion 43 and the keyboard 10 are sequentially arranged and overlap each other when observed in the Y axis direction perpendicular to the central axis M. In the completely closed state, the first side 421 is parallel to the side 12 of the keyboard 10. Moreover, in the completely closed state, the first screen portion 41 and the second screen portion 42 and the third screen portion 43 are not coplanar. That is to say, in the completely closed state, the screen 40 of the computer 100 is not expanded.

Figure 5:
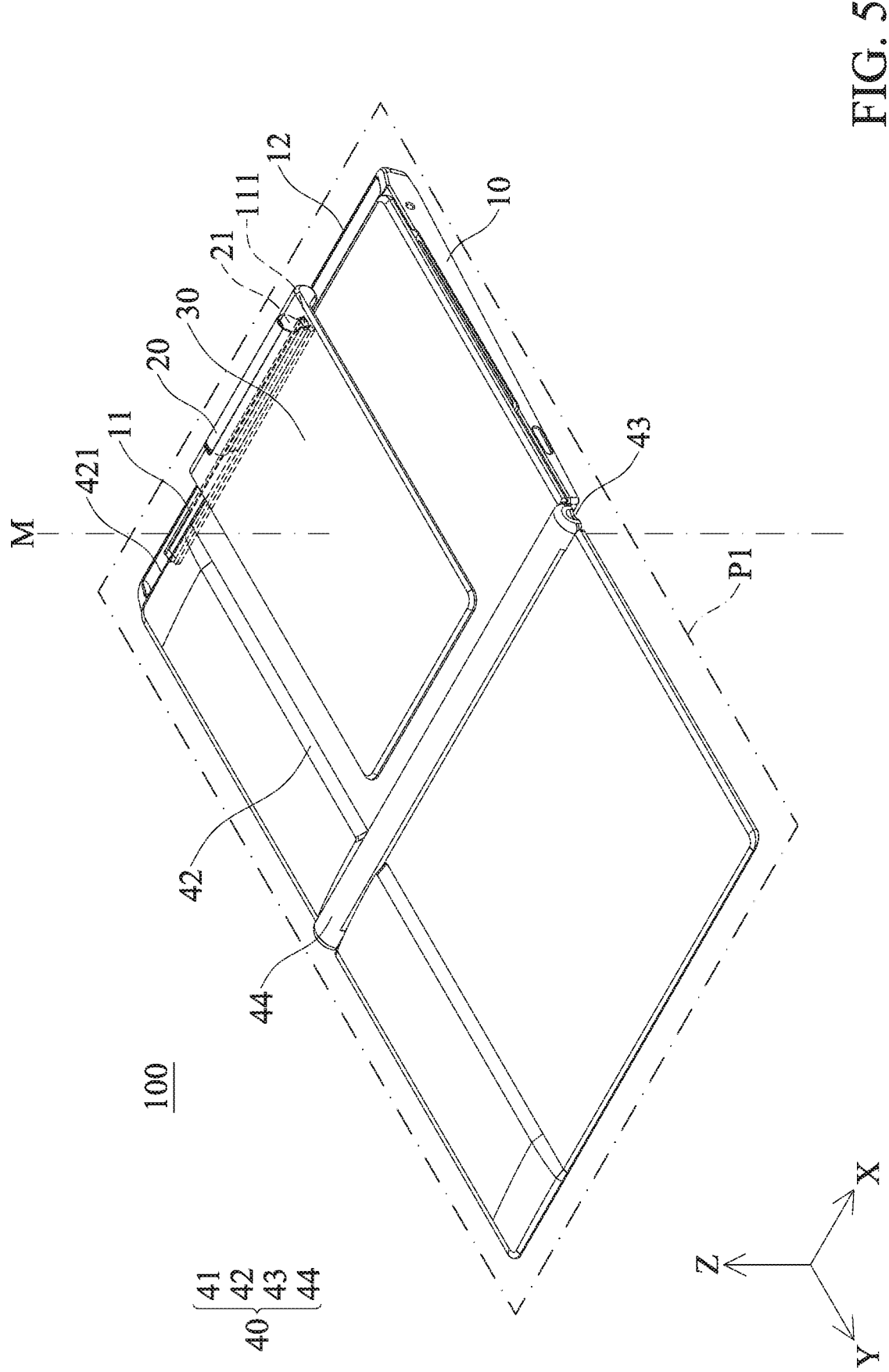
FIG. 5 illustrates a perspective view of the computer in a partially closed state according to some embodiment of the present disclosure.

Please refer to FIG. 5, FIG. 5 is a schematic view of the computer 100 in a partially closed state. The computer 100 may transform between the completely closed state shown in FIG. 4A and the partially closed state shown in FIG. 5 by rotating the screen pivot shaft 44.

As shown in FIG. 5, when the computer 100 is in the partially closed state, the supporting plate 30, the second screen portion 42 and the keyboard 10 are sequentially arranged and overlap each other when observed along the central axis M of the keyboard 10, and they are penetrated by the central axis M. Moreover, the screen pivot shaft 44 and the third screen portion 43 overlap each other when observed along the central axis M. Furthermore, in the partially closed state, the first end 21 of the pivot shaft 20 abuts the first pivot groove wall 111 of the pivot groove 11. It should be noted that the portion indicated by the dashed line represents the portion that is actually shielded by other element of the computer 100 (not able to be directly observed by the naked eye).

Please continue to refer to FIG. 5, in the partially closed state, the first side 421 is parallel to the side 12 of the keyboard 10. Furthermore, in the partially closed state, the first screen portion 41, the second screen portion 42 and the third screen portion 43 are located on a first plane P1, and the first plane P1 is substantially parallel to the keyboard 10. In this state, the screen 40 is in contact with the keyboard 10, and the screen 40 is expanded.

Specifically, the difference between the computer 100 in the partially closed state shown in FIG. 5 and the computer 100 in the completely closed state shown in FIG. 4A is that the screen 40 of the computer 100 in FIG. 5 is expanded, and the screen 40 of the computer 100 in FIG. 4A is not expanded.

Figure 6:
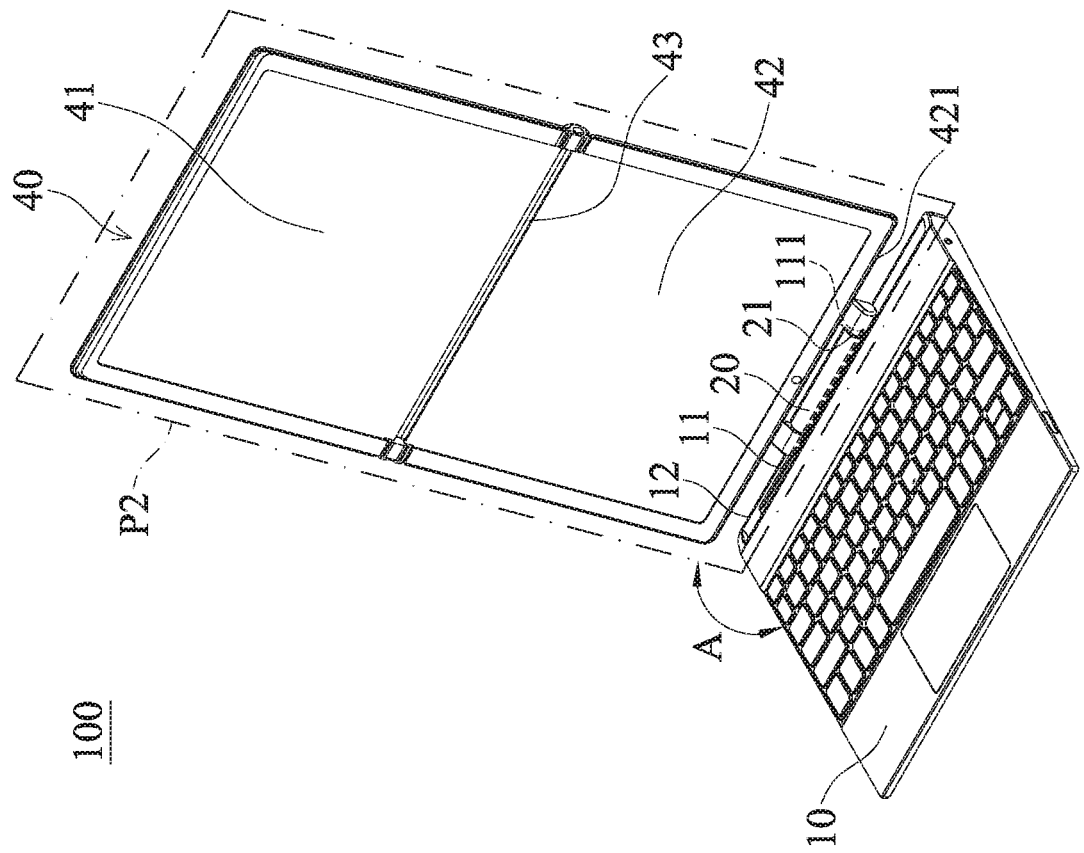
FIG. 6 illustrates a perspective view of the computer in an upright state according to some embodiment of the present disclosure.

Please refer to FIG. 6, FIG. 6 is a schematic view of the computer 100 in an upright state. The computer 100 may transform between the partially closed state shown in FIG. 5 and the upright state shown in FIG. 6 by rotating the pivot shaft 20.

As shown in FIG. 6, when the computer 100 is in the upright state, the first screen portion 41, the second screen portion 42 and the third screen portion 43 are located on a second plane P2, and the second plane P2 and the keyboard 10 are at a non-zero angle A. Moreover, in the upright state, the first side 421 is parallel to the side 12 of the keyboard 10. In this state, the screen 40 is not in contact with the keyboard 10, and the screen 40 is extended upright. Furthermore, in the upright state, the first end 21 of the pivot shaft 20 abuts the first pivot groove wall 111 of the pivot groove 11. It should be noted that the portion indicated by the dashed line represents the portion that is actually shielded by other element of the computer 100 (not able to be directly observed by the naked eye).

Specifically, the difference between the computer 100 in the upright state shown in FIG. 6 and the computer 100 in the partially closed state shown in FIG. 5 is that the screen 40 of the computer 100 in FIG. 6 is upright, and the screen 40 of the computer 100 in FIG. 5 is non-upright.

Figure 7A:
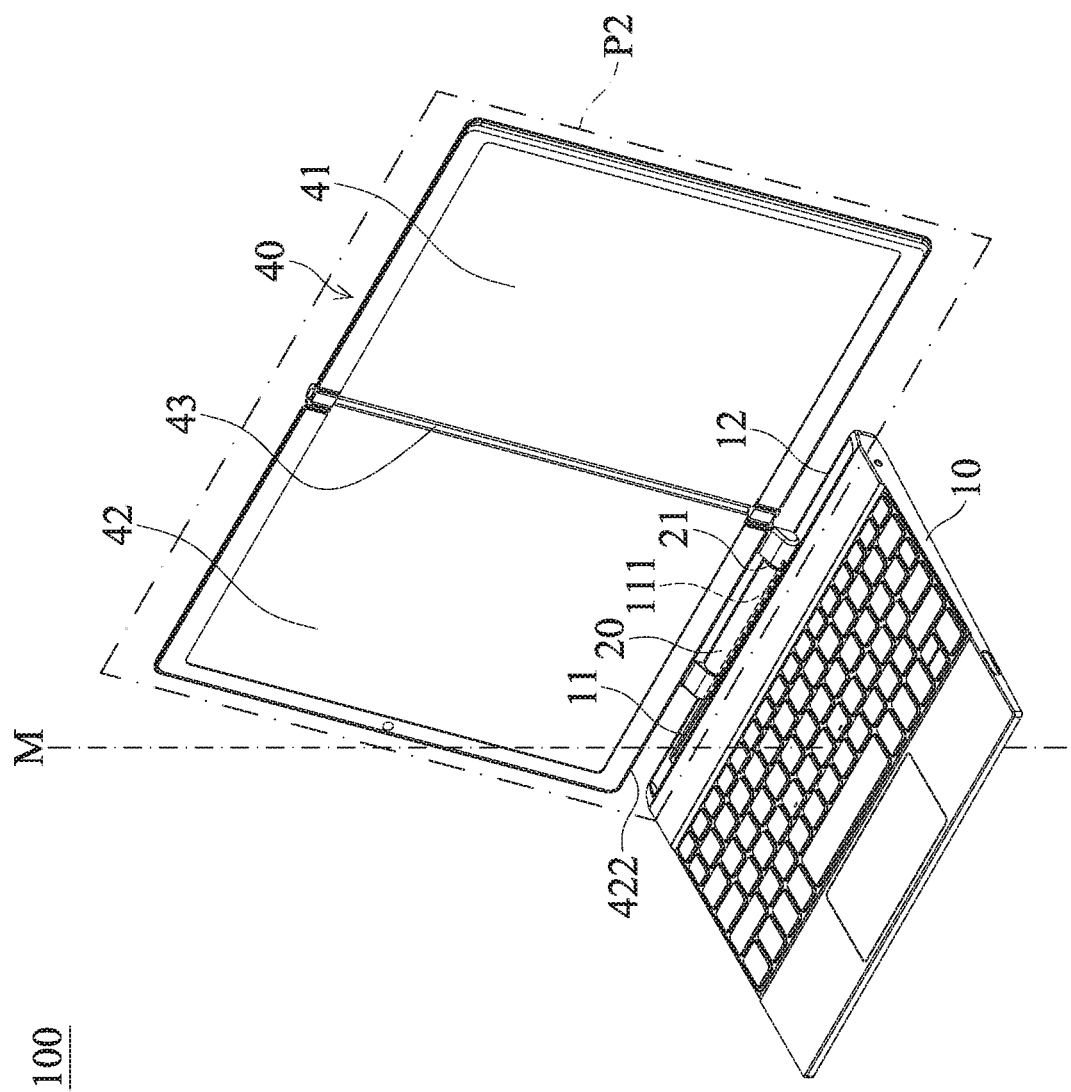
FIG. 7A illustrates a perspective view of the computer in a lateral state according to some embodiment of the present disclosure.
Figure 7B:
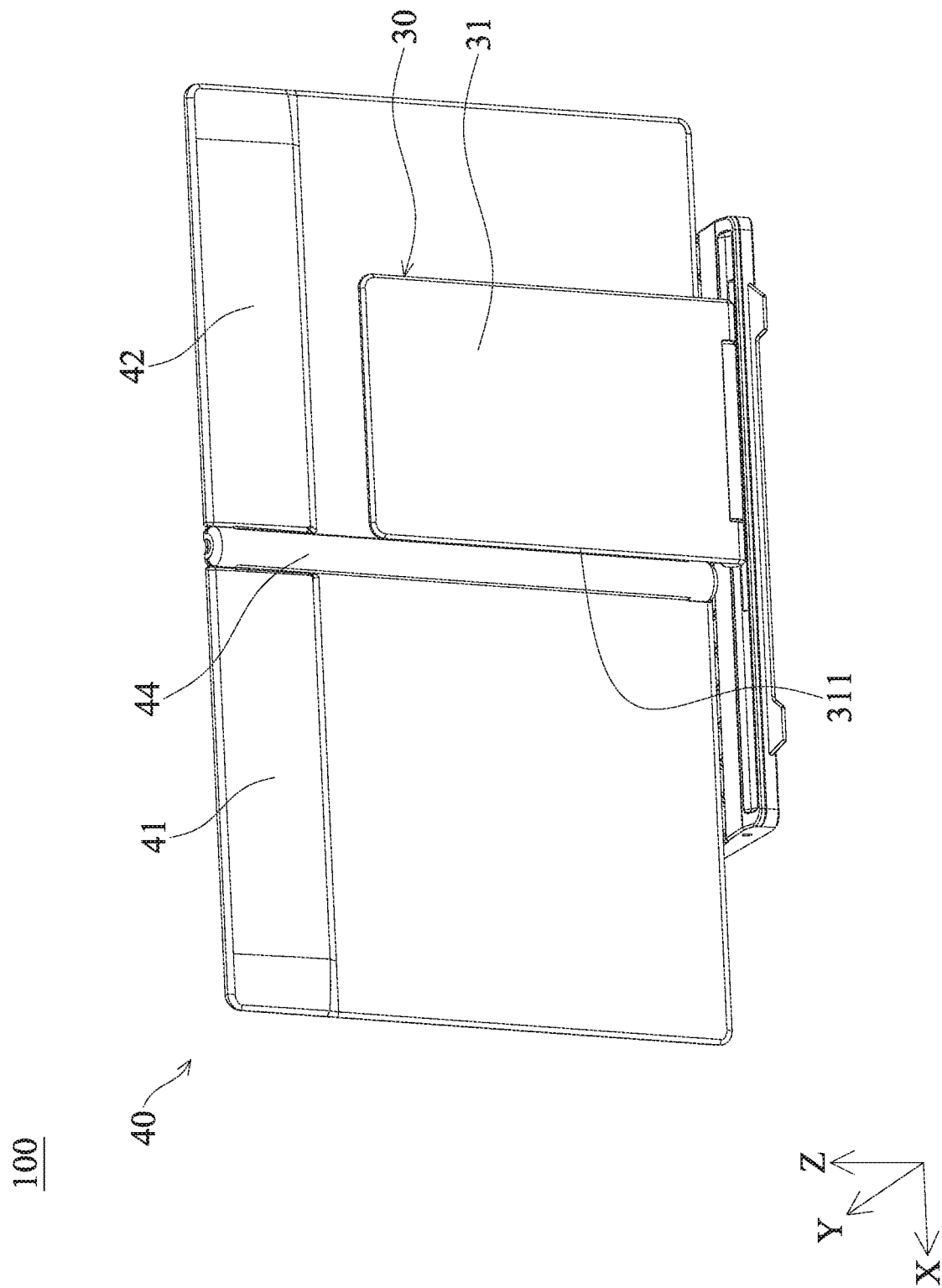
FIG. 7B illustrates a rear view of the computer in the lateral state according to some embodiment of the present disclosure.

Please refer to FIG. 7A and FIG. 7B, FIG. 7A and FIG. 7B are schematic views of the computer 100 in a lateral state. Please refer to FIG. 7C and FIG. 7D, the computer 100 may transform between the upright state shown in FIG. 6 and the lateral state shown in FIG. 7A and FIG. 7B by rotating the supporting plate pivot 32 (shown as a dashed line).

Figure 7C:
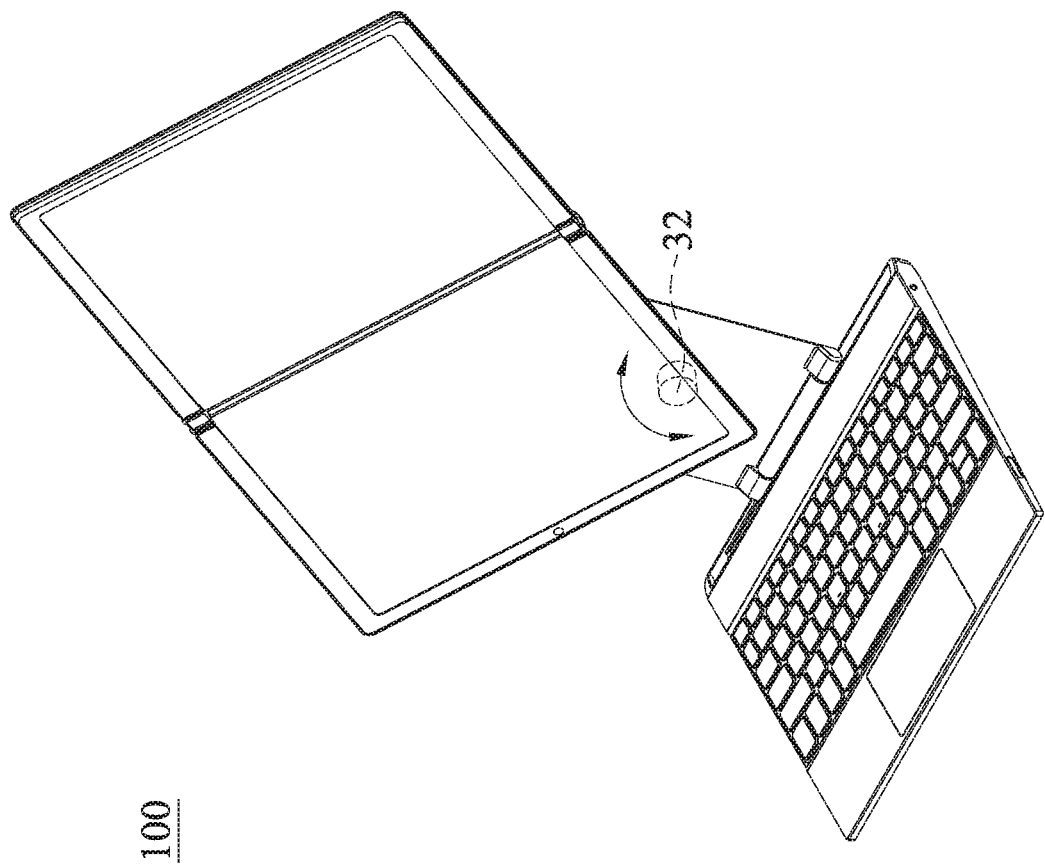
FIG. 7C illustrates a schematic view of the computer transforming between the upright state shown in FIG. 6 and the lateral state shown in FIG. 7A and FIG. 7B by rotating a supporting plate pivot in one direction.

In the embodiment shown in FIG. 7C, the computer 100 may transform from the upright state shown in FIG. 6 to the lateral state shown in FIG. 7A and FIG. 7B by rotating the supporting plate pivot 32 (shown as a dashed line) clockwise; and the computer 100 may transform from the lateral state shown in FIG. 7A and FIG. 7B to the upright state shown in FIG. 6 by rotating the supporting plate pivot 32 counter-clockwise.

Figure 7D:
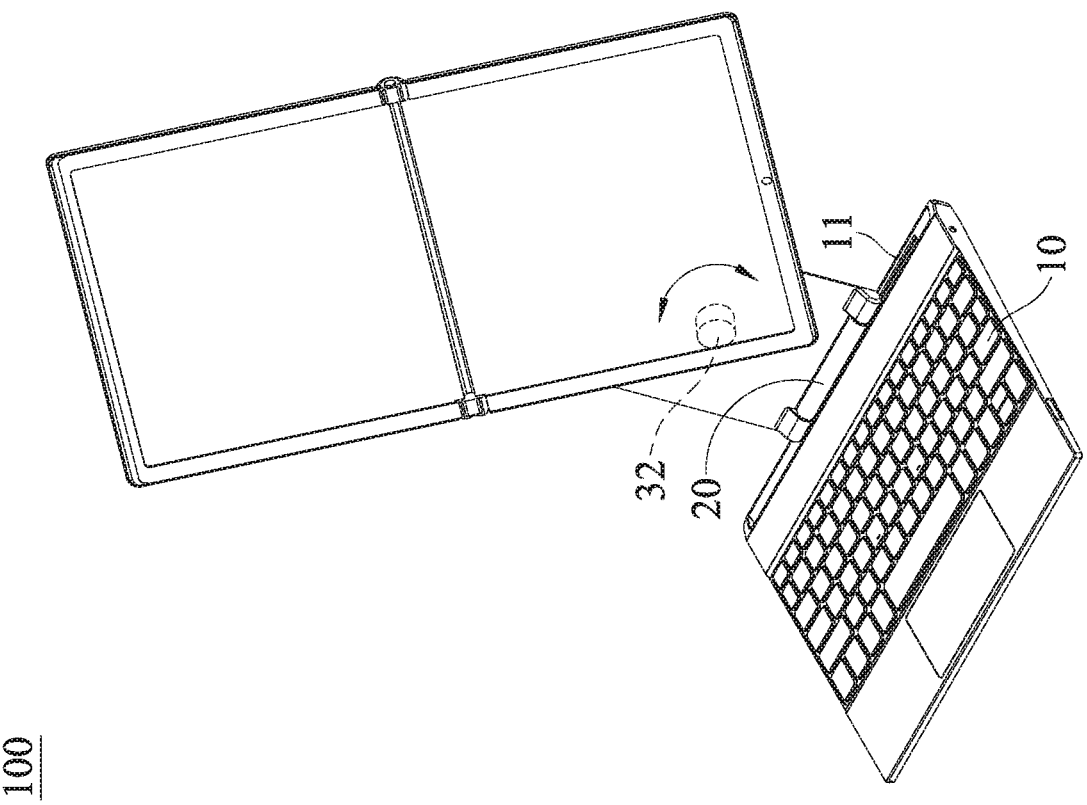
FIG. 7D illustrates a schematic view of the computer transforming between the upright state shown in FIG. 6 and the lateral state shown in FIG. 7A and FIG. 7B by rotating the supporting plate pivot in another direction.

In the embodiment shown in FIG. 7D, the computer 100 may transform from the upright state shown in FIG. 6 to the lateral state shown in FIG. 7A and FIG. 7B by rotating the supporting plate pivot 32 (shown as a dashed line) counter-clockwise; and the computer 100 may transform from the lateral state shown in FIG. 7A and FIG. 7B to the upright state shown in FIG. 6 by rotating the supporting plate pivot 32 clockwise. It should be noted that, in the embodiment shown in FIG. 7D, the pivot groove 11 is located on the right side (+X axis) of the keyboard 10 so that the pivot shaft 20 may move along the +X axis.

As shown in FIG. 7A and FIG. 7B, the first screen portion 41, the second screen portion 42 and the third screen portion 43 are located on the second plane P2 when the computer 100 is in the lateral state. In the lateral state, the central axis M does not overlap the screen pivot shaft 44 when viewed along the Y axis. Moreover, in the lateral state, the second side 422 is parallel to the side 12 of the keyboard 10. Furthermore, in the lateral state, the first end 21 of the pivot shaft 20 abuts the first pivot groove wall 111 of the pivot groove 11. It should be noted that the portion indicated by the dashed line in FIG. 7A represents the portion that is actually shielded by other element of the computer 100 (not able to be directly observed by the naked eye).

As shown in FIG. 7B, in order to effectively increase the area of the supporting plate 30, so that the contact area between the supporting plate body 31 and the second screen portion 42 is maximized, the supporting plate body side 311 may abut the screen pivot shaft 44. In this way, the supporting plate 30 may hold the screen 40 more securely.

Specifically, the difference between the computer 100 in the lateral state shown in FIG. 7A and FIG. 7B and the computer 100 in the upright state shown in FIG. 6 is that the screen 40 of the computer 100 in FIG. 7A and FIG. 7B is lateral, and the screen 40 of the computer 100 in FIG. 6 is upright.

Figure 8A:
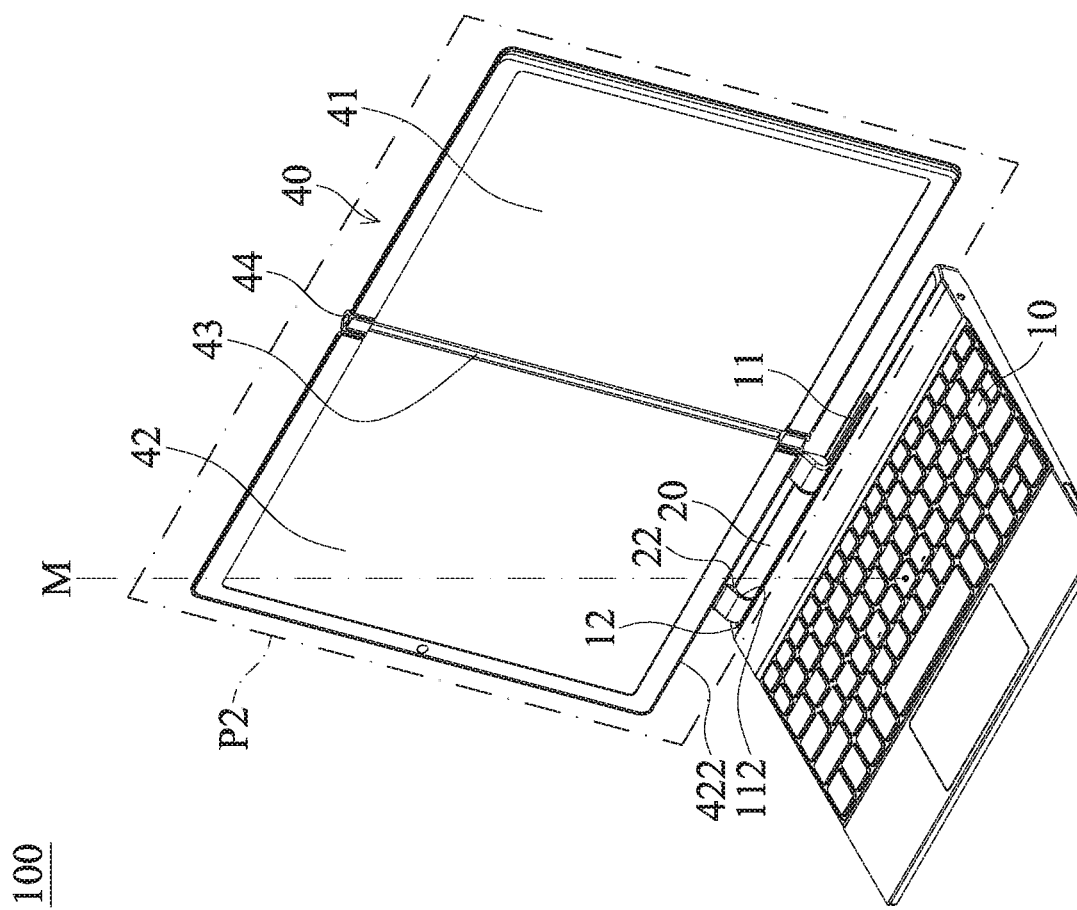
FIG. 8A illustrates a perspective view of the computer in a completely open state according to some embodiment of the present disclosure.
Figure 8B:
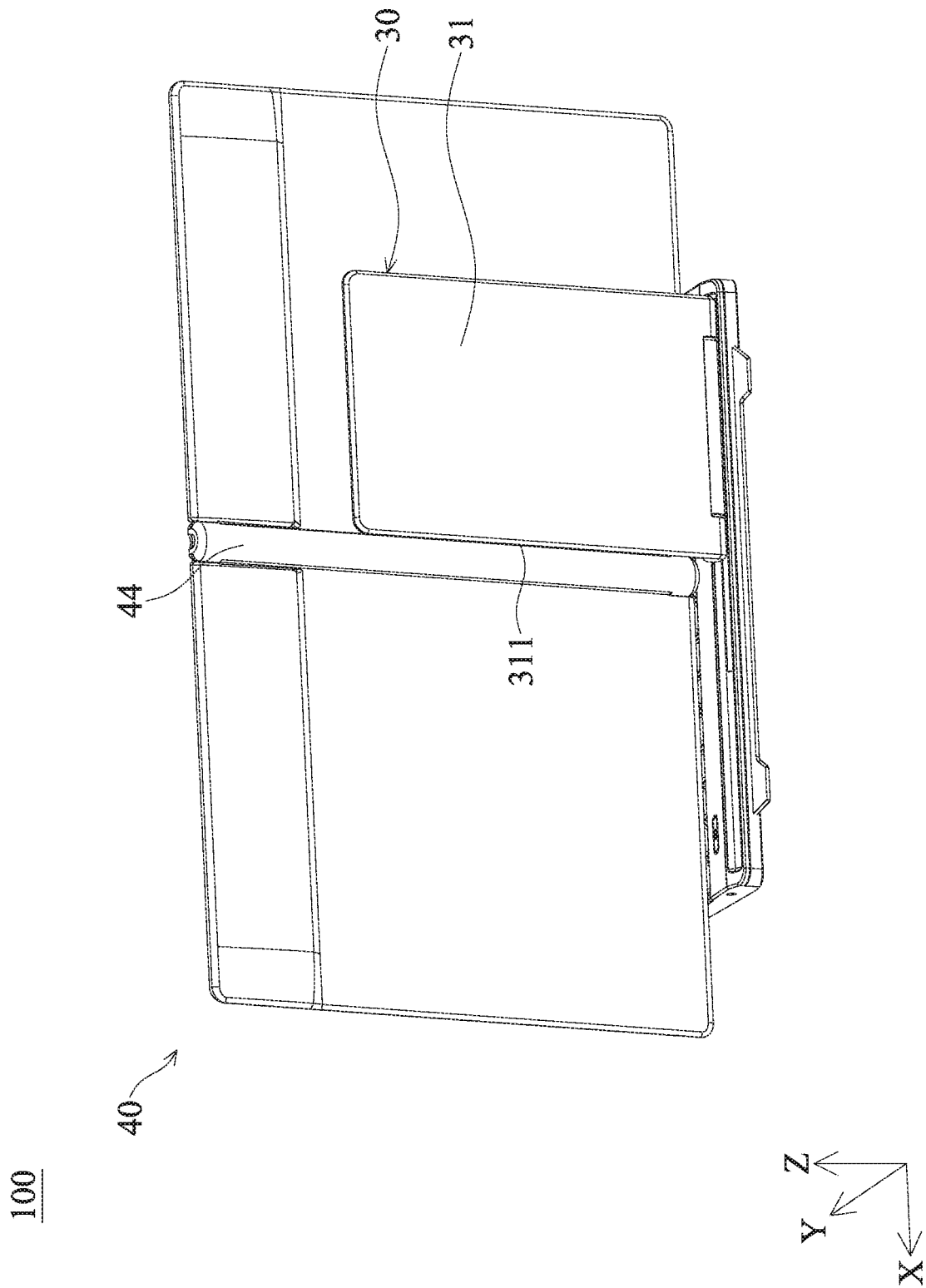
FIG. 8B illustrates a rear view of the computer in the completely open state according to some embodiment of the present disclosure.

Please refer to FIG. 8A and FIG. 8B, FIG. 8A and FIG. 8B are schematic views of the computer 100 in a completely open state. Please refer to FIG. 8C and FIG. 8D, the computer 100 may transform between the lateral state shown in FIG. 7A and FIG. 7B and the completely open state shown in FIG. 8A and FIG. 8B by rotating the pivot shaft 20.

Figure 8C:
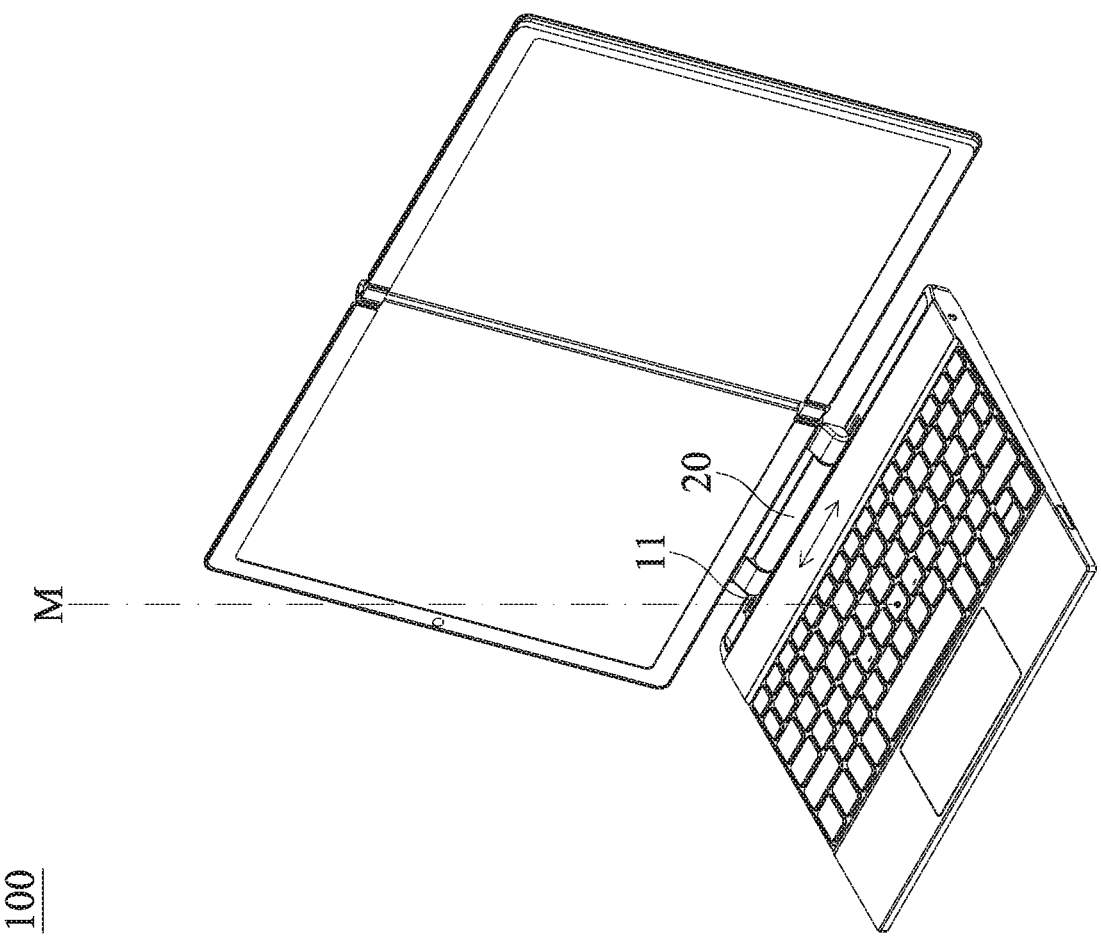
FIG. 8C illustrates a schematic view of the computer transforming between the lateral state shown in FIG. 7A and FIG. 7B and the completely open state shown in FIG. 8A and FIG. 8B by rotating a pivot shaft in one direction.

In the embodiment shown in FIG. 8C, the computer 100 may transform from the lateral state shown in FIG. 7A and FIG. 7B to the completely open state shown in FIG. 8A and FIG. 8B by moving the pivot shaft 20 in the pivot groove 11 along +X axis perpendicular to the central axis M and Y axis; and the computer 100 may transform from the completely open state shown in FIG. 8A and FIG. 8B to the lateral state shown in FIG. 7A and FIG. 7B by moving the pivot shaft 20 in the pivot groove 11 along −X axis.

Figure 8D:
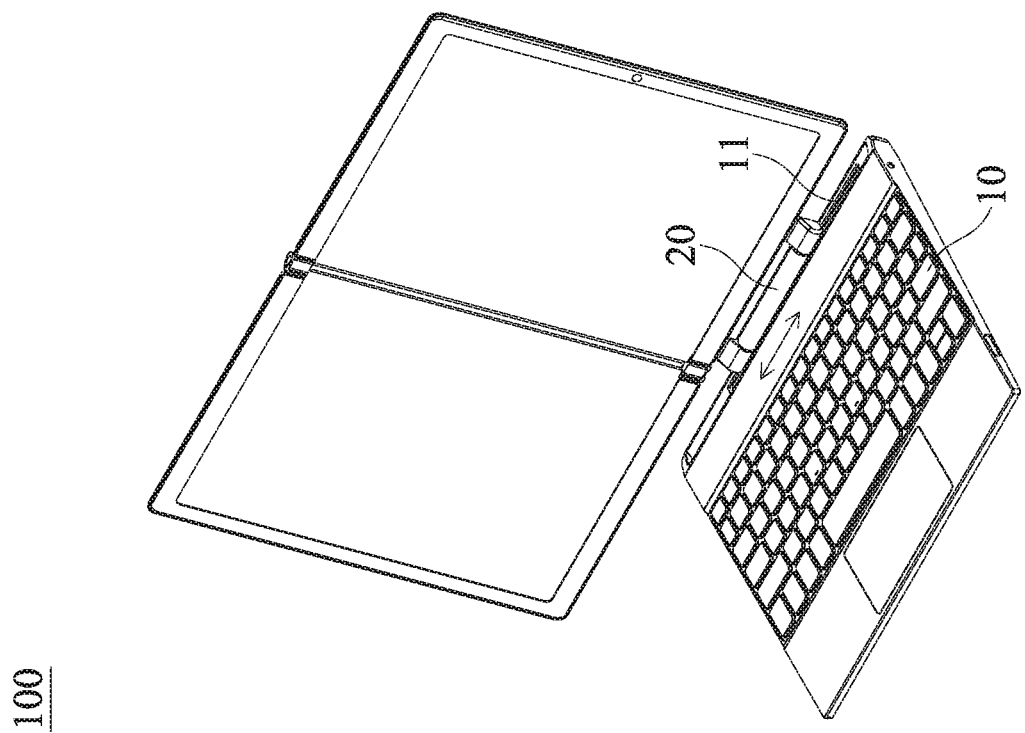
FIG. 8D illustrates a schematic view of the computer transforming between the lateral state shown in FIG. 7A and FIG. 7B and the completely open state shown in FIG. 8A and FIG. 8B by rotating the pivot shaft in another direction.

In the embodiment shown in FIG. 8D, the pivot groove 11 is located on the right side (+X axis) of the keyboard 10. Therefore, the computer 100 may transform from the lateral state shown in FIG. 7A and FIG. 7B to the completely open state shown in FIG. 8A and FIG. 8B by moving the pivot shaft 20 in the pivot groove 11 along −X axis; and the computer 100 may transform from the completely open state shown in FIG. 8A and FIG. 8B to the lateral state shown in FIG. 7A and FIG. 7B by moving the pivot shaft 20 in the pivot groove 11 along +X axis.

As shown in the FIG. 8A and FIG. 8B, when the computer 100 is in the completely open state, the first screen portion 41, the second screen portion 42 and the third screen portion 43 are located on the second plane P2. In the completely open state, the central axis M, the screen pivot shaft 44 and the third screen portion 43 are overlapped when observed along Y axis. Moreover, in the completely open state, the second side 422 is parallel to the side 12 of the keyboard 10. Furthermore, in the completely closed state, the second end 22 of the pivot shaft 20 abuts the second pivot groove wall 112 of the pivot groove 11.

Similarly, as shown in FIG. 8B, in the completely open state, the supporting plate body side 311 abuts the screen pivot shaft 44 so that the contact area between the supporting plate body 31 and the second screen portion 42 is maximized, and the supporting plate 30 may hold the screen 40 more securely.

That is, the difference between the computer 100 in the completely open state shown in FIG. 8A and FIG. 8B and the computer 100 in the lateral state shown in FIG. 7A and FIG. 7B is that the third screen portion 43 of the computer 100 in FIG. 8A and FIG. 8B is aligned with the central axis M, and the third screen portion 43 of the computer 100 in FIG. 7A and FIG. 7B is not aligned with the central axis M.

To sum up, the area of the screen 40 of the computer 100 of the present disclosure is more than twice the area of the keyboard 10 (having a large screen), and the area of the computer 100 of the present disclosure in the completely closed state is only the same as the area of the keyboard 10 (effect of thinning and lightening). Therefore, the computer 100 of the present disclosure also has a large screen and the effect of thinning and lightening. In other words, the computer 100 of the present disclosure solves the problem of a computer with a large screen and easy to carry and move at the same time. In the present disclosure, the contact area between the supporting plate 30 and the screen 40 is maximized, so that the screen 40 of the computer 100 in the present disclosure is more secured.

Although the various examples of the present disclosure have been described above, it should be understood that they are presented by way of examples only, not as a limitation. In the case of not departing from the true spirit and scope of the present disclosure, many changes may be made according to the examples of the present disclosure. Thus, the width and scope of the present disclosure should not be limited by any of the above examples. Rather, the scope of the present disclosure should be defined in accordance with the following claims and their equivalents.

Although the present disclosure is shown and described based on one or more embodiments, but a person ordinary skilled in the art to which the present disclosure belongs may make some equivalent changes and modifications according to the reading and understanding of the specification and the accompanying drawings. Furthermore, although a particular feature of the present disclosure may disclose only one of the several embodiments, this feature may be combined with one or more other features of the other embodiments in any particular and special applications.

What is claimed is:

1. A computer, comprising:
   a keyboard;
   a pivot shaft, movably disposed on the keyboard;
   a supporting plate, connected to the pivot shaft, rotatable relative to the keyboard, and comprising a supporting plate pivot; and
   a screen, connected to the supporting plate pivot to rotate relative to the supporting plate,
   wherein the keyboard has a pivot groove, the pivot shaft moves in the pivot groove, and the pivot groove has a first pivot groove wall and a second pivot groove wall to limit the movement of the pivot shaft.

2. The computer as claimed in claim 1, wherein the screen comprises:
   a first screen portion;
   a second screen portion, connected to the pivot shaft; and
   a screen pivot shaft, connected to the first screen portion and the second screen portion,
   wherein the first screen portion rotates relative to the second screen portion by the screen pivot shaft.

3. The computer as claimed in claim 2, wherein the area of the first screen portion is substantially the same as the area of the keyboard, and the area of the second screen portion is substantially the same as the area of the keyboard.

4. The computer as claimed in claim 2, wherein the supporting plate further comprises a supporting plate body, the supporting plate body is connected to the second screen portion, and the supporting plate body has a supporting plate body side contacting the screen pivot shaft.

5. The computer as claimed in claim 2, wherein the screen pivot shaft has a groove, and when the groove accommodates a portion of the keyboard, the supporting plate, the second screen portion, the keyboard and the first screen portion are sequentially arranged and overlap each other.

6. The computer as claimed in claim 2, wherein the second screen portion comprises a first side, the keyboard comprises a side, the screen pivot shaft has a groove, and when the groove accommodates a portion of the keyboard, the first side is parallel to the side.

7. The computer as claimed in claim 2, wherein the screen pivot shaft has a groove, and the first screen portion and the second screen portion are not coplanar when the groove accommodates a portion of the keyboard.

8. The computer as claimed in claim 2, wherein the screen further comprises a third screen portion connected to the first screen portion, the second screen portion, and the screen pivot shaft, and the first screen portion rotates relative to the third screen portion by the screen pivot shaft.

9. The computer as claimed in claim 8, wherein the screen pivot shaft has a groove, and the first screen portion, the second screen portion and the third screen portion are not coplanar when the groove accommodates a portion of the keyboard.

10. The computer as claimed in claim 8, wherein the first screen portion, the second portion and the third screen portion are located on a plane.

11. The computer as claimed in claim 10, wherein the screen pivot shaft has a groove, and when the groove accommodates a portion of the keyboard and a portion of the third screen portion, the screen pivot shaft, the third screen portion and the keyboard are sequentially arranged and overlap each other.

12. The computer as claimed in claim 10, wherein the second screen portion comprises a first side, the keyboard comprises a side, and the first side is parallel to the side when the plane is substantially parallel to the keyboard.

13. The computer as claimed in claim 10, wherein the screen is in contact with the keyboard when the plane is substantially parallel to the keyboard.

14. The computer as claimed in claim 10, wherein the second screen portion comprises a first side, the keyboard comprises a side, the first side is parallel to the side when the plane and the keyboard are at a non-zero angle.

15. The computer as claimed in claim 10, wherein the second screen portion comprises a second side, the keyboard comprises a side, and the second side is parallel to the side when the plane and the keyboard are at a non-zero angle.

16. The computer as claimed in claim 10, wherein the screen is not in contact with the keyboard when the plane and the keyboard are at a non-zero angle.

17. A computer, comprising:
a keyboard;
a pivot shaft, movably disposed on the keyboard;
a supporting plate, connected to the pivot shaft, rotatable relative to the keyboard, and comprising a supporting plate pivot; and
a screen, connected to the supporting plate pivot to rotate relative to the supporting plate,
wherein the area of the screen is more than twice the area of the keyboard.

* * * * *